(12) United States Patent
Hsueh et al.

(10) Patent No.: US 8,583,045 B2
(45) Date of Patent: *Nov. 12, 2013

(54) METHOD OF PAIRING A COMPUTER AND WIRELESS ELECTRONIC DEVICES

(75) Inventors: Tsung-Wen Hsueh, Taipei (TW); Shi-Jie Zhang, Taipei (TW)

(73) Assignee: Primax Electronics Ltd., Taipei (TW)

( * ) Notice: Subject to any disclaimer, the term of this patent is extended or adjusted under 35 U.S.C. 154(b) by 246 days.

This patent is subject to a terminal disclaimer.

(21) Appl. No.: 13/045,326

(22) Filed: Mar. 10, 2011

(65) Prior Publication Data

US 2012/0184216 A1 Jul. 19, 2012

(30) Foreign Application Priority Data

Jan. 14, 2011 (TW) .............................. 100101399 A

(51) Int. Cl.
*H04B 7/00* (2006.01)

(52) U.S. Cl.
USPC .......................... 455/41.3; 455/41.1; 455/41.2

(58) Field of Classification Search
USPC .................... 455/41.1–41.3, 88, 550.1, 556.1
See application file for complete search history.

(56) References Cited

U.S. PATENT DOCUMENTS

| | | | |
|---|---|---|---|
| 8,166,149 B2 * | 4/2012 | Ishimoto ....................... 709/223 |
| 2007/0072562 A1 * | 3/2007 | Yang ............................. 455/106 |
| 2009/0327449 A1 * | 12/2009 | Silverman et al. ............. 709/217 |
| 2011/0081860 A1 * | 4/2011 | Brown et al. ................. 455/41.3 |

* cited by examiner

*Primary Examiner* — Tuan H Nguyen
(74) *Attorney, Agent, or Firm* — Kirton McConkie; Evan R. Witt

(57) ABSTRACT

The present invention discloses a method for pairing a computer and wireless electronic devices including searching at least one wireless electronic device adjacent to a computer; recording a media access control (MAC) address of the wireless electronic device; pairing the computer and the wireless electronic device; and generating a pairing complete message. The present invention saves time of selecting the wireless electronic device from a candidate list and also provides a convenient and easy pairing method.

5 Claims, 9 Drawing Sheets

METHOD OF PAIRING A COMPUTER AND WIRELESS ELECTRONIC DEVICES

FIELD OF THE INVENTION

The present invention generally relates to a pairing method, and more particularly to a method of pairing a computer and at least one wireless electronic device.

BACKGROUND OF THE INVENTION

With the wireless transmission technology, such as Bluetooth, infrared, etc., grows into maturity, various wireless electronic devices are gradually instead of the wired devices to form the common computer peripheral devices, such as a wireless mouse, a wireless keyboard or a wireless communication device.

At the first time for a wireless electronic device communicating with a computer, the wireless electronic device needs to be paired with the computer, so as to successfully transmit the data to the computer. A conventional method of pairing a computer 10 installed a Microsoft® Windows® series operating system (OS) and a wireless mouse 21 is illustrated below.

Referring to FIG. 1, FIG. 1 illustrates a schematic view of a conventional method of pairing a computer and at least a wireless electronic device. A power source of a wireless mouse 21 is activated first and a pairing button (not shown) is pressed to let the wireless mouse 21 generate and transmit a pairing request message. After that, a wireless transmitting function of the computer 10 is enabled, so as to add a wireless electronic device 20 by a build-in utility of the Microsoft® Windows® OS as described from the step S10 to the step S12.

Referring to FIG. 2, FIG. 2 illustrates a flow chart of a conventional method of pairing a computer and a wireless electronic device. As illustrated in step S10, the computer 10 starts to search at least one wireless electronic device 20 adjacent to the computer 10. Next, the step S11 is processed to display a searching list 111 on a monitor 11 of the computer 10 as illustrated in FIG. 3, FIG. 3 illustrates schematic view of a searching list of a conventional method of pairing a computer and at least a wireless electronic device.

The searching list 111 displays all of the searched wireless electronic devices 20, and each of the wireless electronic devices 20 has a corresponding icon, for example, the wireless mouse 21 corresponds to a mouse icon 210, the wireless keyboard corresponds to a keyboard icon 220, the wireless communication device 23 corresponds to a cell phone icon 230, etc., and thus it is easy to be recognized for selection. When the icon of the wireless electronic device 20 is selected from the searching list 111, for example, when the mouse icon 210 representing the wireless mouse 21 is selected, the step S12 as illustrated in FIG. 2 is processed, and thus starting to pair the computer 10 and the wireless mouse 21.

However, when there are a plurality of wireless electronic devices adjacent to the computer, the correct wireless electronic device usually needs to be selected from a long searching list. Hence, it may waste a lot of time for selection and come out with several wireless electronic devices belong to the same type, such as a plurality of wireless mice, at the same time as well and thus result in difficult selection therefrom. Therefore, it is quite difficult to use and inconvenient.

SUMMARY OF THE INVENTION

The present invention is directed to a method of pairing a computer and at least a wireless electronic device with advantages of time-saving and convenience operation.

In a preferred embodiment, the present invention provides a method of pairing a computer and a wireless electronic device for establishing a connection therebetween and comprising the following steps:

searching at least one wireless electronic device adjacent to the computer;

recording a media access control (MAC) address of the wireless electronic device;

pairing the computer and the wireless electronic device; and generating a pairing complete message.

In a preferred embodiment, the step of generating the pairing complete message is displaying the pairing complete message on a monitor of the computer.

In a preferred embodiment, the step of generating the pairing complete message comprises displaying the pairing complete message on a monitor of the computer and transmitting a pairing notice signal to the wireless electronic device.

In a preferred embodiment, the wireless electronic device generates a light signal, a sound signal or a vibration signal after receiving the pairing notice signal.

In a preferred embodiment, the step of searching the wireless electronic device adjacent to the computer comprises:

receiving a pairing request message of the wireless electronic device; and transmitting a request response message according to the pairing request message.

In a preferred embodiment, the step of pairing the computer and the wireless electronic device comprises:

generating an initialization code;

verifying the computer to generate a first pairing data;

verifying the wireless electronic device to generate a second pairing data; and transmitting the first pairing data to the wireless electronic device and receiving the second pairing data.

In a preferred embodiment, the wireless electronic device is a wireless input device, a wireless audio output device or a wireless communication device.

In a preferred embodiment, the present invention provides a method of pairing a computer and a plurality of wireless electronic devices for establishing connections therebetween and comprising the following steps:

searching the plurality of wireless electronic devices adjacent to the computer, wherein each of the plurality of wireless electronic devices has a media access control (MAC) address;

receiving and recording the MAC addresses of the plurality of wireless electronic devices;

pairing the computer and a first wireless electronic device of the plurality of wireless electronic devices;

generating a pairing complete message; and determining to pair the computer and the a second wireless electronic device of the plurality of wireless electronic devices if receiving a re-pairing request message.

In a preferred embodiment, the step of generating the pairing complete message is displaying the pairing complete message on a monitor of the computer.

In a preferred embodiment, the step of generating the pairing complete message comprises displaying the pairing complete message on a monitor of the computer and transmitting a pairing notice signal to the first wireless electronic device.

In a preferred embodiment, the first wireless electronic device generates a light signal, a sound signal or a vibration signal after receiving the pairing notice signal.

In a preferred embodiment, the step of searching the plurality of wireless electronic devices adjacent to the computer comprises:

receiving a pairing request message of each of the plurality of wireless electronic devices; and transmitting a request response message according to each of the pairing request messages.

In a preferred embodiment, the step of pairing the computer and the first wireless electronic device comprises:

generating an initialization code;

verifying the computer to generate a first pairing data;

verifying the first wireless electronic device to generate a second pairing data; and transmitting the first pairing data to the first wireless electronic device and receiving the second pairing data.

DETAILED DESCRIPTION OF THE PREFERRED EMBODIMENT

Reference will now be made in detail to specific embodiments of the present invention. Examples of these embodiments are illustrated in the accompanying drawings. While the invention will be described in conjunction with these specific embodiments, it will be understood that it is not intended to limit the invention to these embodiments. In fact, it is intended to cover alternatives, modifications, and equivalents as may be included within the spirit and scope of the invention as defined by the appended claims. In the following description, numerous specific details are set forth in order to provide a through understanding of the present invention. The present invention may be practiced without some or all of these specific details. In other instances, well-known process operations are not described in detail in order not to obscure the present invention.

Figure 1:
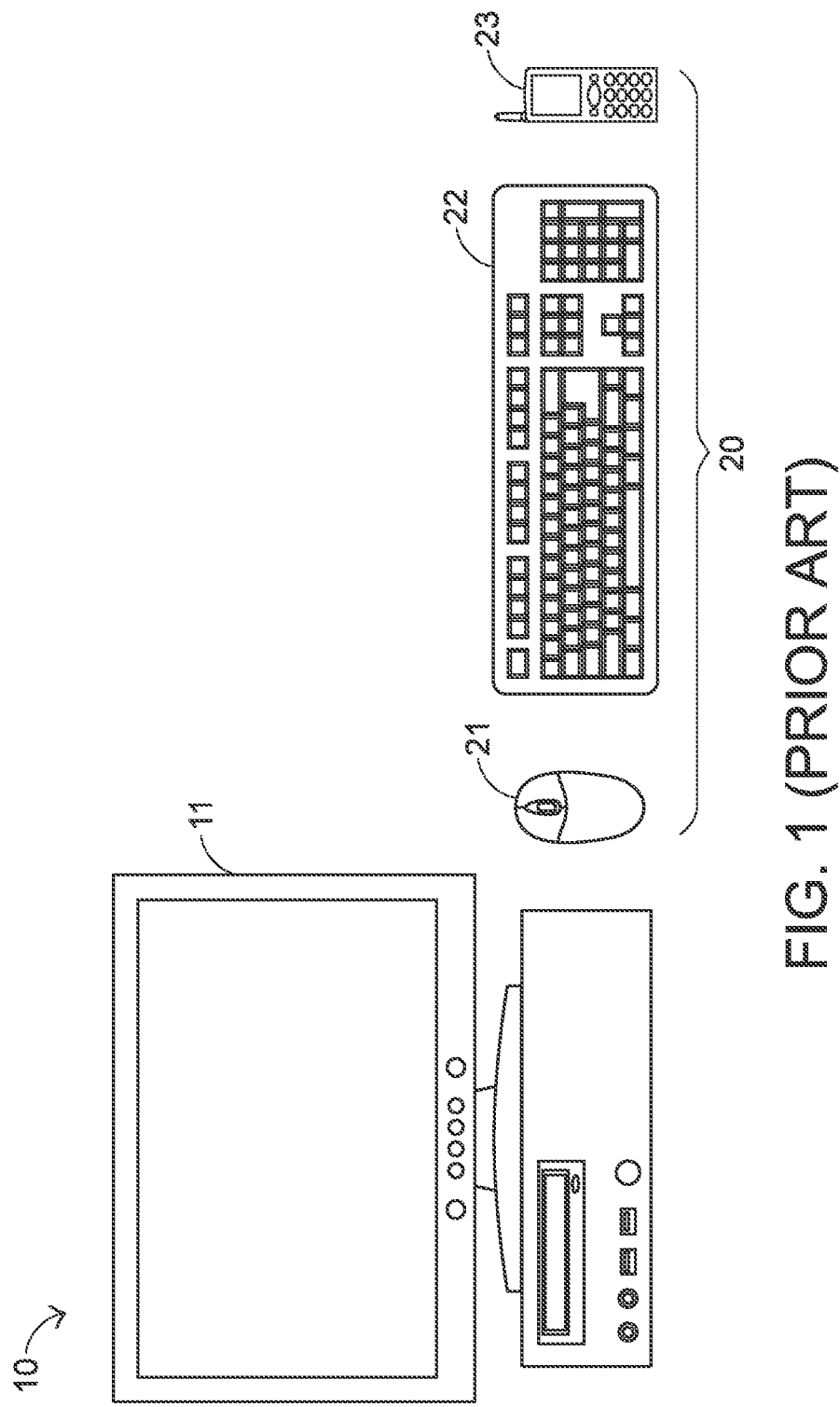
FIG. 1 illustrates a schematic view of a conventional method of pairing a computer and at least a wireless electronic device.
Figure 2:
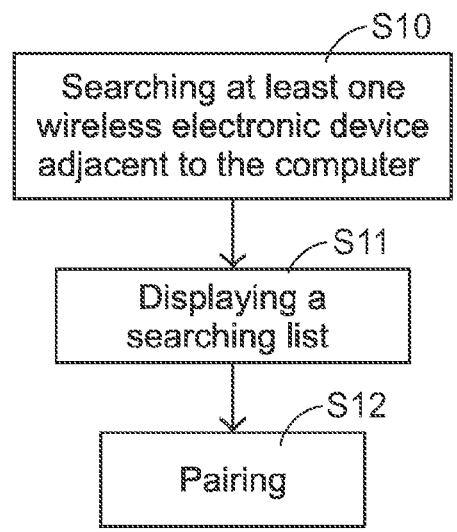
FIG. 2 illustrates a flow chart of a conventional method of pairing a computer and a wireless electronic device.
Figure 3:
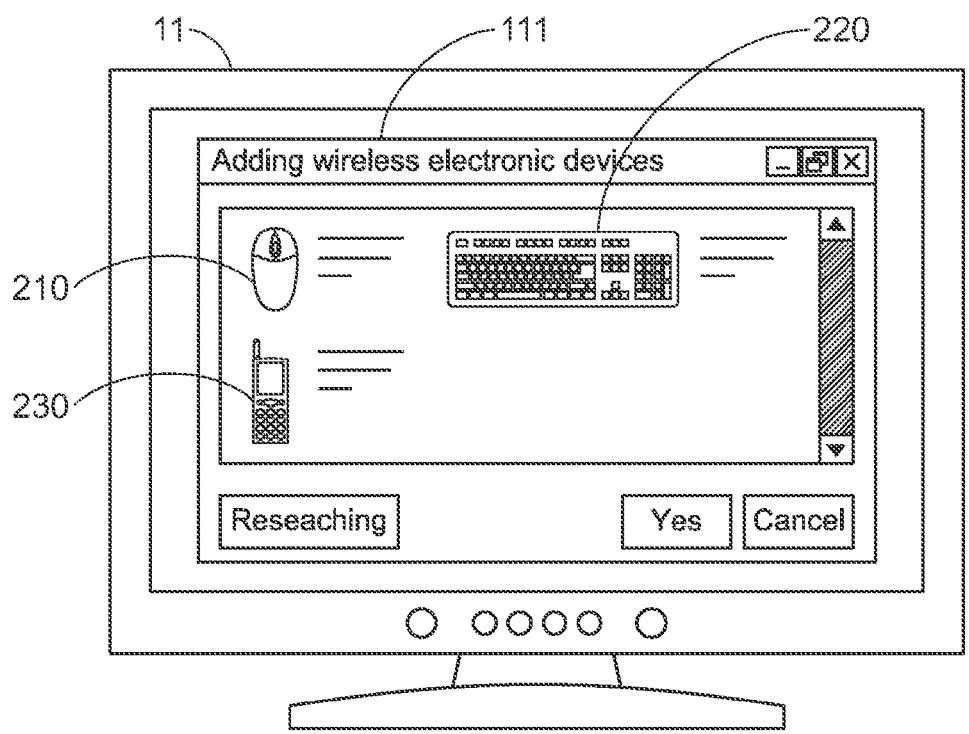
FIG. 3 illustrates schematic view of a searching list of a conventional method of pairing a computer and at least a wireless electronic device.
Figure 4:
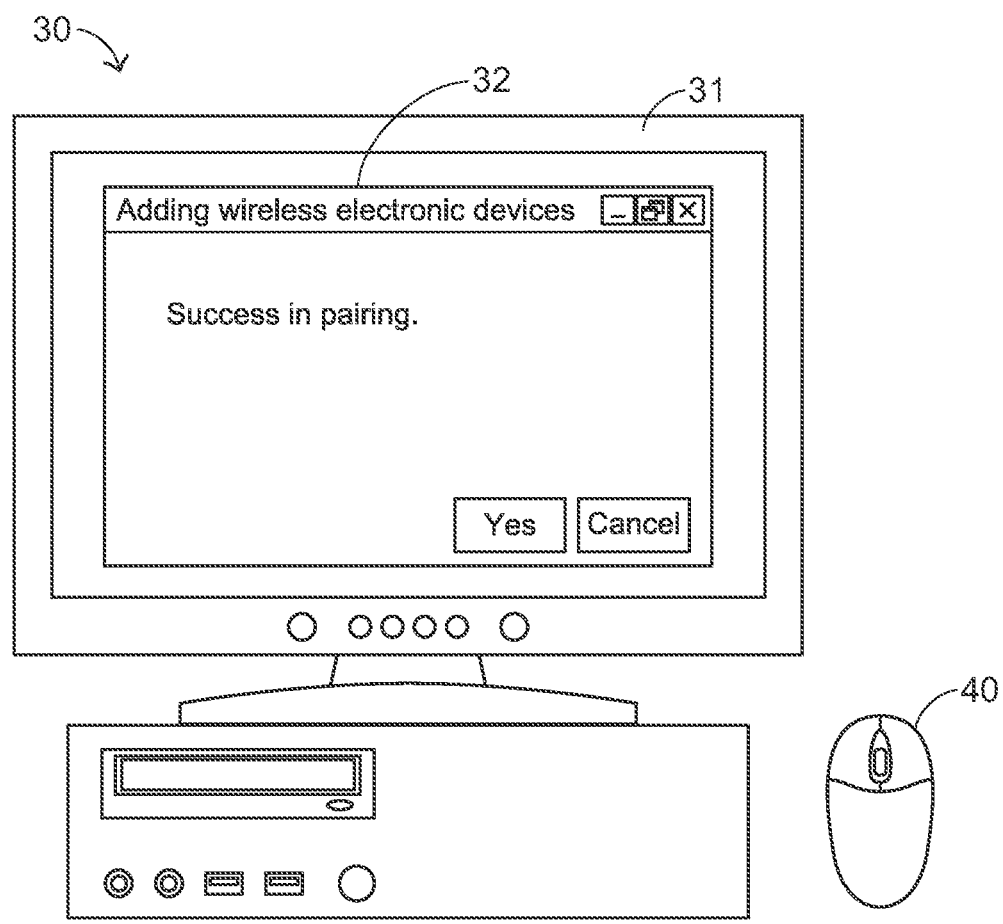
FIG. 4 illustrates a schematic view of a method of pairing a computer and a wireless electronic device according to a first embodiment of the present invention.

Referring to FIG. 4, FIG. 4 illustrates a schematic view of a method of pairing a computer and a wireless electronic device according to a first embodiment of the present invention. A computer 30, a monitor 31 and a wireless electronic device are presented in FIG. 4. In the present invention, the wireless electronic device may be a wireless input device (such as a wireless mouse, a wireless keyboard, etc.), a wireless audio output device (such as a wireless earphone, a wireless headset, etc.), or a wireless communication device (such as a cell phone, a personal digital assistant (PDA)), etc. In the present embodiment, the wireless electronic device is illustrated as a wireless mouse 40.

First, a power source of the wireless mouse 40 is activated and a pairing button (not shown) of the wireless mouse 40 is pressed to let the wireless mouse 40 generate and transmit a pairing request message to computer 30. The pairing request message contains a media access control (MAC) address of the wireless mouse 40.

Figure 5:
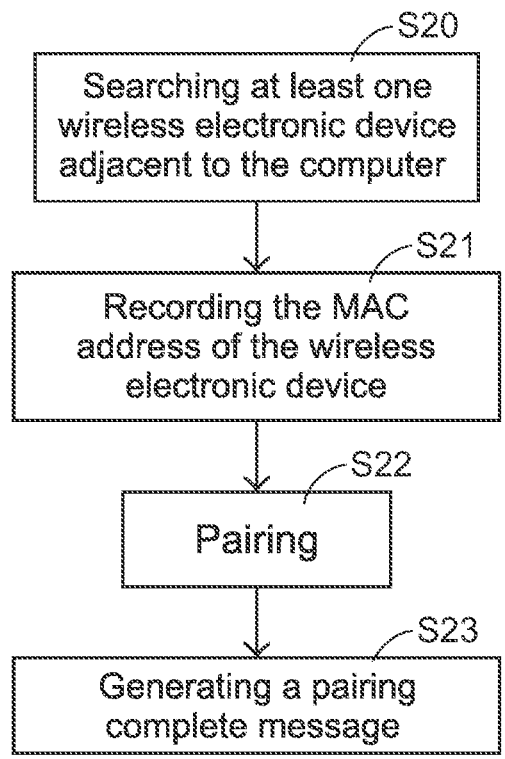
FIG. 5 illustrates a flow chart of a method of pairing a computer and a wireless electronic device according to the first embodiment of the present invention.

Referring to FIG. 5, FIG. 5 illustrates a flow chart of a method of pairing a computer and a wireless electronic device according to the first embodiment of the present invention. In the step S20, the computer 30 starts to search at least one wireless electronic device adjacent to the computer 30.

Figure 6:
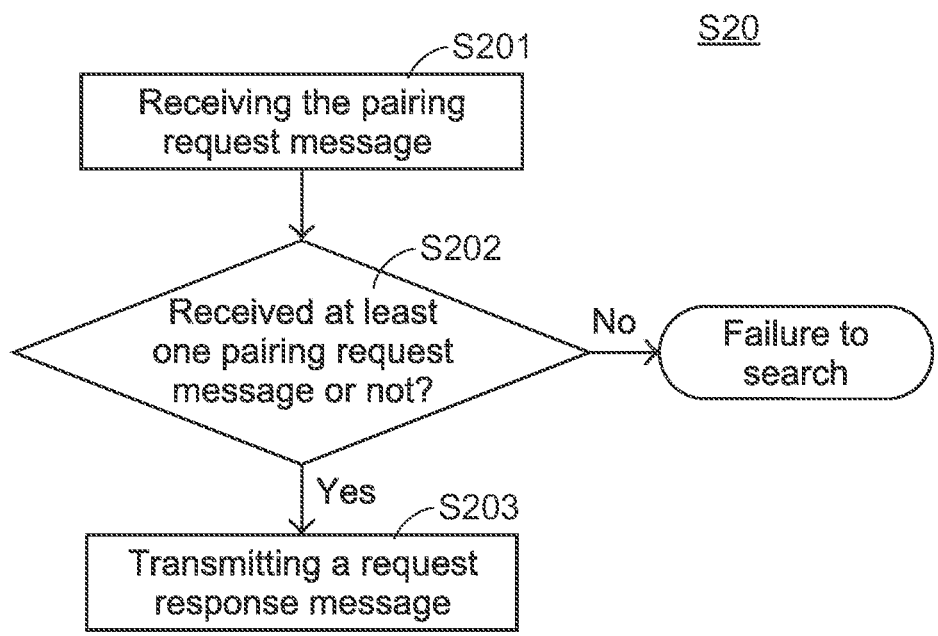
FIG. 6 illustrates a flow chart of the step S20 of a method of pairing a computer and a wireless electronic device according to the first embodiment of the present invention.

Referring to FIG. 6 for the searching process, FIG. 6 illustrates a flow chart of the step S20 of a method of pairing a computer and a wireless electronic device according to the first embodiment of the present invention. In the step S201, the computer 30 receives the pairing request message transmitted by the wireless mouse 40, and processes the step S202 in a predetermined period to determine whether the computer 30 receives at least one pairing request message or not. If yes, then process the step S203 to transmit a request response message to the wireless mouse 40 according to the pairing request message and go to the step S21. If not, then the searching process is failure. The wireless mouse 40 switches into a pairing mode when the wireless mouse 40 receives the request response message.

In the step S21, the computer 30 obtains and records the MAC address of the wireless mouse 40 by the pairing request message in the step S20. Since each of the wireless electronic devices has a set of unique MAC address, the computer 30 may recognize different wireless electronic devices by the MAC address records when the number of the wireless electronic device is a plural.

Figure 7:
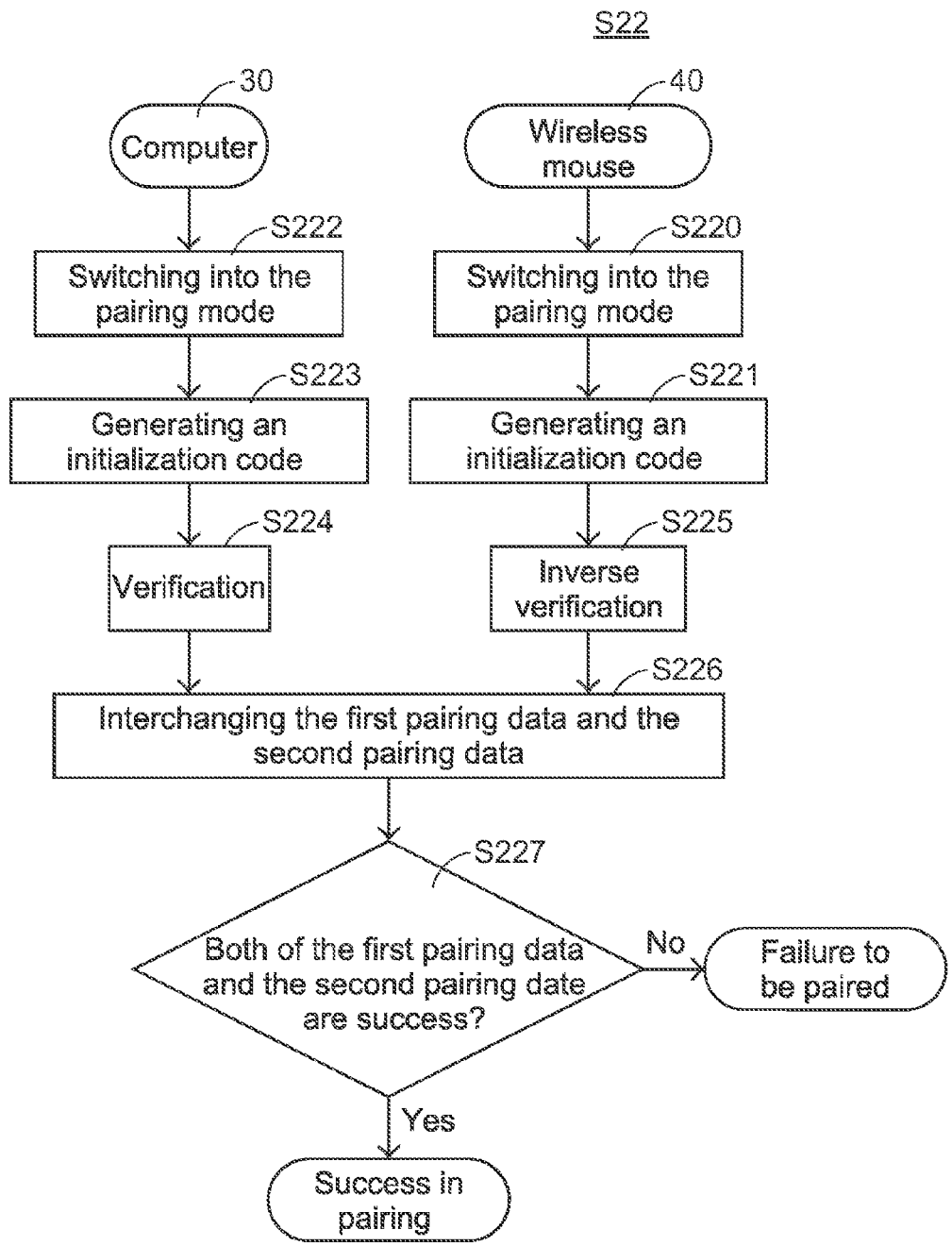
FIG. 7 illustrates a flow chart of the step S22 of a method of pairing a computer and a wireless electronic device according to the first embodiment of the present invention.

In the step S22, the computer 30 is pairing with the wireless mouse 40, and the pairing process is similar to the conventional pairing process and simply described in the following description. Referring to FIG. 7, FIG. 7 illustrates a flow chart of the step S22 of a method of pairing a computer and a wireless electronic device according to the first embodiment of the present invention.

In the step S220, the wireless mouse 40 is switched into the pairing mode to generate and transmit a set of random number.

In the step S221, the wireless mouse 40 generates an initialization code by using the random number generated by itself and the request response message in the step S20 to provide an encrypted environment for verification.

In the step S222, the computer 30 switches into the pairing mode and receives the set of random number.

In the step S223, the computer 30 generates an initialization code by using the random number from the wireless mouse 40 and the request response message in the step S20 to provide an encrypted environment for verification.

In the step S224, a verification of the computer 30 is processed. The computer 30 generates a set of verification random number and transmits the verification random number to the wireless mouse 40. The wireless mouse 40 computes the verification random number by using a verification function to generate a response number, and then compiles the response number to the computer 30 to generate a first pairing data. If the response number and the number computed by the computer 30 are the same, then the first pairing data is success, however, if they are different, then the first pairing data is failure.

In the step S225, an inverse verification of the wireless mouse 40 is processed. The wireless mouse 40 generates a set of inverse verification random number and transmits the inverse verification random number to the computer 30. The computer 30 computes the inverse verification random number by using an inverse verification function to generate another response number, and then compiles the other response number to the wireless mouse 40 to generate a second pairing data. If the other response number and the number computed by the wireless mouse 40 are the same, then the second pairing data is success, however, if they are different, then the second pairing data is failure.

After the first pairing data and the second pairing data are generated, the step S226 is processed to interchange the first pairing data and the second pairing data. After the computer 30 transmits the first pairing data to the wireless mouse 40 and receives the second pairing data from the wireless mouse 40, the step S227 is processed to determine whether the first pairing data and the second pairing date are both success or not. If yes, then the computer 30 and the wireless mouse 40 are success in pairing and then the step S23 is processed. If not, then they are failure to be paired.

Referring to FIG. 5 again, in the step S23, the computer 30 generates a pairing complete message 32, which is displayed on the monitor 31 of the computer 30 for notifying users that the computer 30 and the wireless mouse 40 are success in pairing. Moreover, the computer 30 may further transmits a pairing notice signal to the wireless mouse 40 to let the wireless mouse 40 generate a light signal, a sound signal or a vibration signal, so as to notify users where is the paired wireless electronic device 40.

Figure 8:
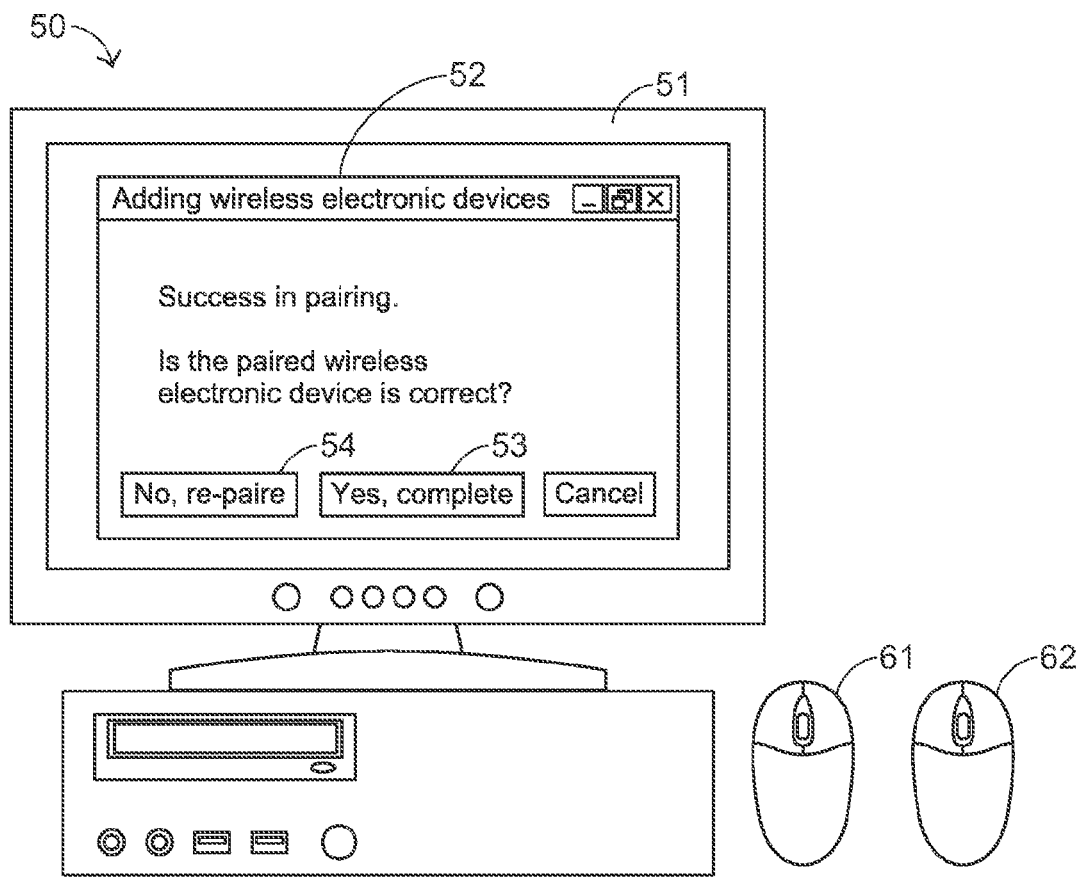
FIG. 8 illustrates a schematic view of a method of pairing a computer and wireless electronic devices according to a second embodiment of the present invention.

Referring to FIG. 8, FIG. 8 illustrates a schematic view of a method of pairing a computer and wireless electronic devices according to a second embodiment of the present invention. A computer 50, a monitor 51 and two wireless mice 61, 62 are presented in FIG. 8. First, a power source of the wireless mouse 61 is activated and a pairing button (not shown) of the wireless mouse 61 is pressed to let the wireless mouse 61 generate and transmit a pairing request message, wherein the pairing request message contains a media access control (MAC) address of the wireless mouse 61.

Figure 9:
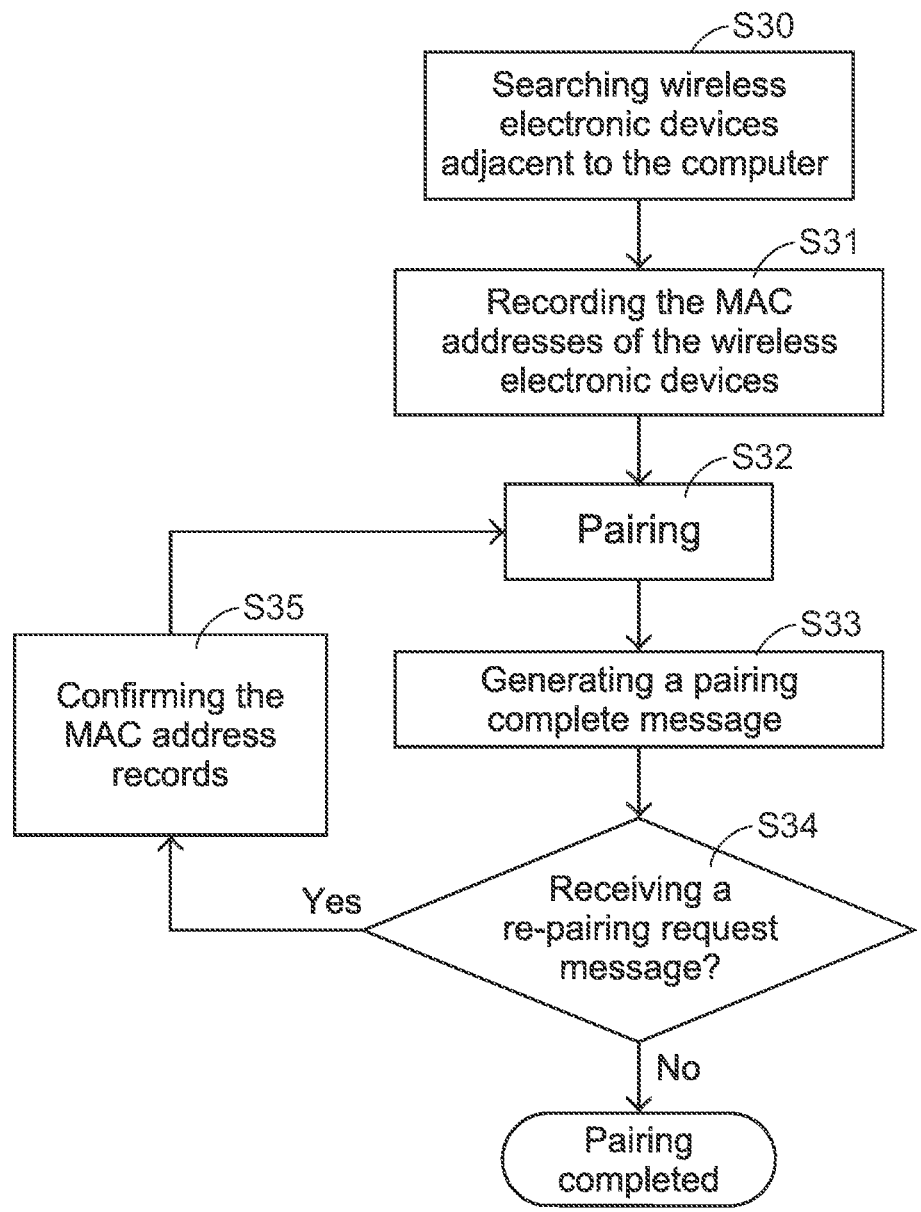
FIG. 9 illustrates a flow chart of a method of pairing a computer and wireless electronic devices according to the second embodiment of the present invention.

Referring to FIG. 9, FIG. 9 illustrates a flow chart of a method of pairing a computer and wireless electronic devices according to the second embodiment of the present invention. In the step S30, the computer 50 starts to search wireless electronic devices adjacent to the computer 50, wherein the wireless electronic devices in the present embodiment comprise the wireless mouse 61 and the wireless mouse 62. The wireless mouse 61 and the wireless mouse 62 have different MAC addresses.

Figure 10:
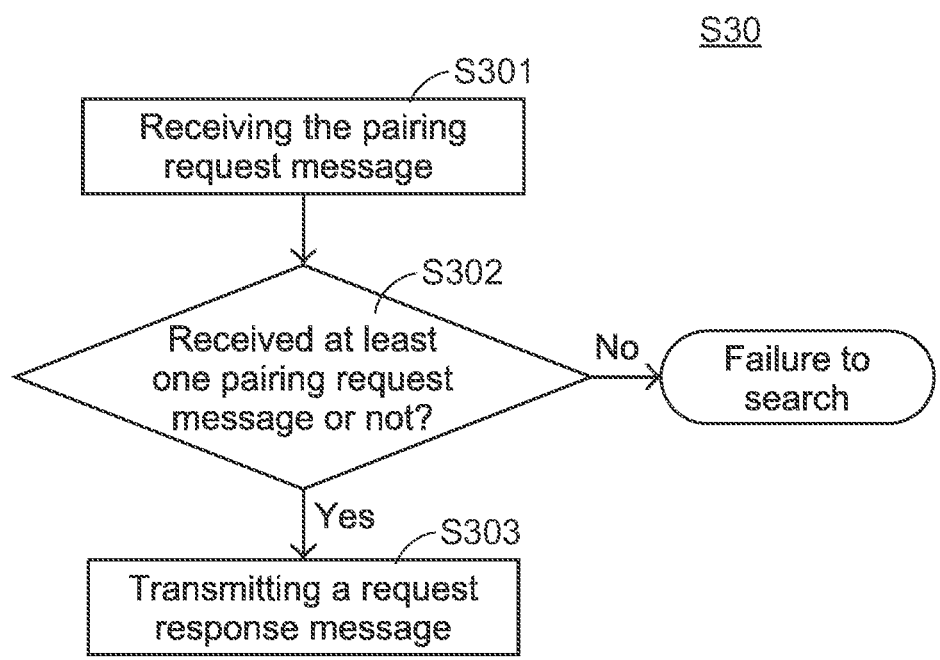
FIG. 10 illustrates a flow chart of the step S30 of a method of pairing a computer and wireless electronic devices according to the second embodiment of the present invention.

Referring to FIG. 10 for the searching process, FIG. 10 illustrates a flow chart of the step S30 of a method of pairing a computer and wireless electronic devices according to the second embodiment of the present invention. In the step S301, the computer 50 with wireless transmission function receives the pairing request messages transmitted by the wireless mouse 61 and the wireless mouse 62, and processes the step S302 in a predetermined period to determine whether the computer 50 receives at least one pairing request message or not. If yes, then process the step S303 to transmit request response messages to the wireless mouse 61 and the wireless mouse 62 according to the pairing request messages and go to the step S31. If not, then the searching process is failure. The wireless mouse 61 and the wireless mouse 62 switch into a pairing mode when the wireless mouse 61 and the wireless mouse 62 receive the request response messages.

In the step S31, the computer 50 obtains and records the MAC addresses of the wireless mouse 61 and the wireless mouse 62 by the pairing request messages in the step S30. Since the wireless mouse 61 and the wireless mouse 62 have different MAC addresses, the computer 50 may recognize the wireless mouse 61 and the wireless mouse 62 by the MAC address records.

Figure 11:
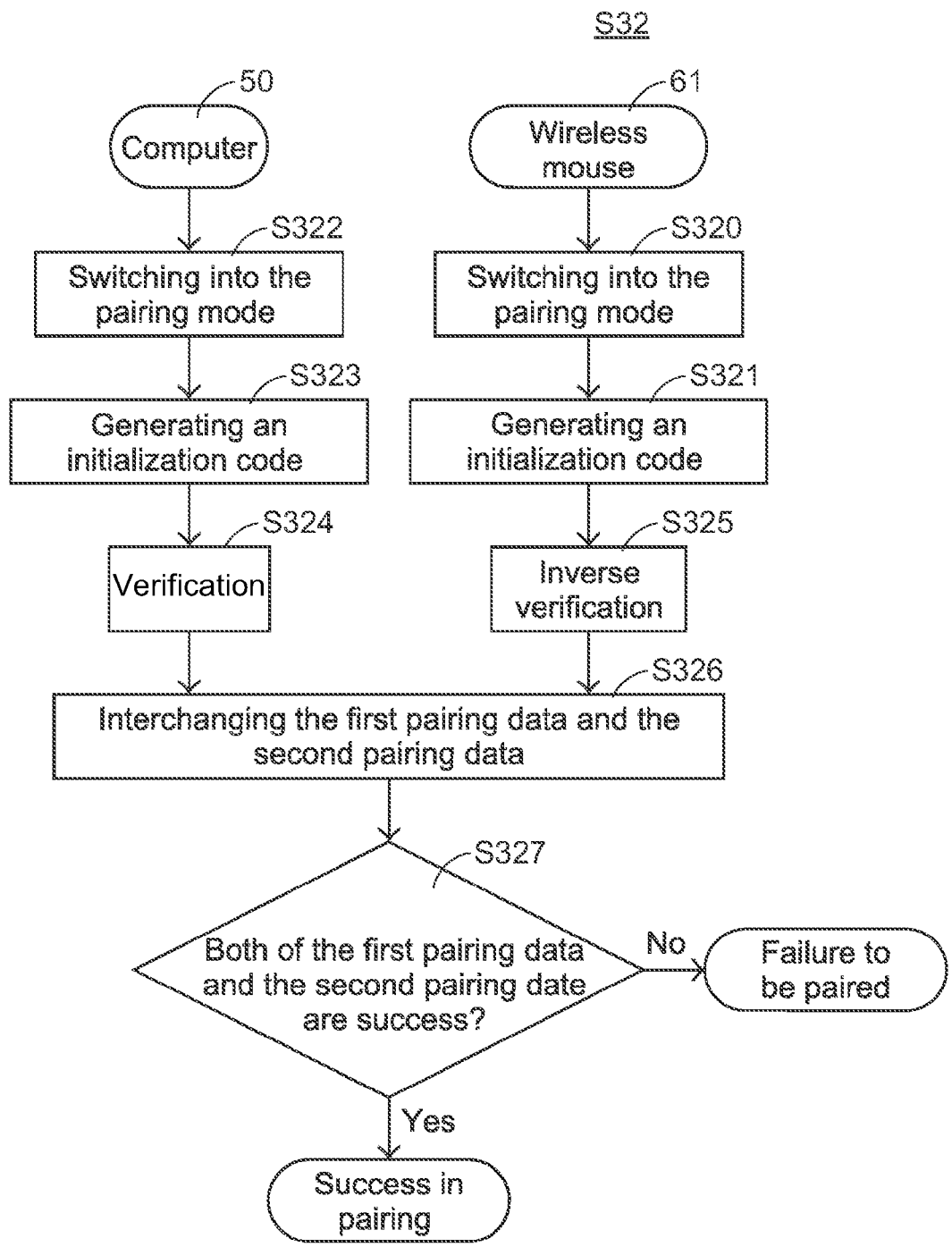
FIG. 11 illustrates a flow chart of the step S32 of a method of pairing a computer and wireless electronic devices according to the second embodiment of the present invention.

In the step S32, the computer 50 is pairing with one of the wireless mouse 61 and the wireless mouse 62. For example, the computer 50 is pairing with the wireless mouse 61, wherein the pairing process is similar to the conventional pairing process and simply described in the following description. Referring to FIG. 11, FIG. 11 illustrates a flow chart of the step S32 of a method of pairing a computer and wireless electronic devices according to the second embodiment of the present invention.

In the step S320, the wireless mouse 61 is switched into the pairing mode to generate and transmit a set of random number.

In the step S321, the wireless mouse 61 generates an initialization code by using the random number generated by itself and the request response message in the step S30 to provide an encrypted environment for verification.

In the step S322, the computer 50 switches into the pairing mode and receives the set of random number generated by the wireless mouse 61.

In the step S323, the computer 50 generates an initialization code by using the random number from the wireless mouse 61 and the request response message in the step S30 to provide an encrypted environment for verification.

In the step S324, a verification of the computer 50 is processed. The computer 50 generates a set of verification random number and transmits the verification random number to the wireless mouse 61. The wireless mouse 61 computes the verification random number by using a verification function to generate a response number, and then compiles the response number to the computer 50 to generate a first pairing data. If the response number and the number computed by the computer 50 are the same, then the first pairing data is success, however, if they are different, then the first pairing data is failure.

In the step S325, an inverse verification of the wireless mouse 61 is processed. The wireless mouse 61 generates a set of inverse verification random number and transmits the inverse verification random number to the computer 50. The computer 50 computes the inverse verification random number by using an inverse verification function to generate another response number, and then compiles the other response number to the wireless mouse 61 to generate a second pairing data. If the other response number and the number computed by the wireless mouse 61 are the same, then the second pairing data is success, however, if they are different, then the second pairing data is failure.

After the first pairing data and the second pairing data are generated, the step S326 is processed to interchange the first pairing data and the second pairing data. After the computer 50 transmits the first pairing data to the wireless mouse 61 and receives the second pairing data from the wireless mouse 61, the step S327 is processed to determine whether the first pairing data and the second pairing date are both success or not. If yes, then the computer 50 and the wireless mouse 61 are success in pairing and then the step S33 is processed. If not, then they are failure to pair.

In the step S33, the computer 50 generates a pairing complete message 52, which is displayed on the monitor 51 of the computer 50 for notifying users that the computer 50 and the wireless mouse 61 are success in pairing. Moreover, the computer 50 may further transmits a pairing notice signal to the wireless mouse 61 to let the wireless mouse 61 generate a light signal, a sound signal or a vibration signal, so as to notify users where is the paired wireless mouse 61.

Further, the pairing complete message 52 further comprises a pairing confirming message, which is displayed as "Is the paired wireless electronic device is correct?", and thus users may confirm whether the wireless mouse 61 is the correct pairing subject or not; if yes, then a re-pairing request message will not be generated; however, if not, then a re-pairing request message is generated.

In the step S34, the computer 50 determines whether a re-pairing request message is received or not. If the wireless mouse 61 is the wireless electronic device desired to be paired, then users may click a button 53 marked as "Yes and complete." to complete the pairing process, and then the wireless mouse 61 may be normally operated on the computer 50. If the wireless mouse 61 is not the wireless electronic device desired to be paired, then users may click a button 54 marked as "No and re-pairing." to transmit a re-pairing request message to the computer 50 and go to the step S35. In the step S35, the computer 50 confirms the MAC address records, excludes the MAC address record of the wireless mouse 61, and then reads the MAC address record of the wireless mouse 62. Thereafter, the step S32 is processed to pair the computer 50 and the second wireless electronic device 62.

According to the description of the above-mentioned preferred embodiments, it is obvious that the method of pairing a computer and at least one wireless electronic device of the present invention uses the step of recording the MAC address(s) of the wireless electronic device(s) to replace the step of selecting a correct wireless electronic device from a searching list in the conventional method. Therefore, the present invention may not only save lots of time for selection, but also provide a simple pairing method to avoid difficult selection from several wireless electronic devices belong to the same type that comes out at the same time that result in quite difficult to use and inconvenient.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A method of pairing a computer and a wireless electronic device for establishing a connection between the computer and the wireless electronic device, comprising:

the wireless electronic device generating and transmitting a pairing request message to the computer when a pairing button of the wireless electronic device is triggered, wherein the pairing request message contains a media access control (MAC) address of the wireless electronic device;

the computer searching at least one wireless electronic device adjacent to the computer;

the computer recording the media access control (MAC) address of the wireless electronic device;

the computer and the wireless electronic device performing a pairing process between the computer and the wireless electronic device;

the computer displaying a pairing complete message on a display of the computer and transmitting a pairing notice signal to the wireless electronic device, wherein the pairing complete message further comprises a pairing confirming message displayed on the display, for confirming whether the wireless electronic device is a correct pairing subject, and when the wireless electronic device is determined to not be the correct pairing subject, the computer receiving a re-pairing request message; and the wireless electronic device generating a light signal, a sound signal or a vibration signal after receiving the pairing notice signal.

2. The method of pairing a computer and a wireless electronic device as claimed in claim 1, wherein the step of searching the wireless electronic device adjacent to the computer comprises:

the computer receiving the pairing request message of the wireless electronic device; and the computer transmitting a request response message according to the pairing request message.

3. The method of pairing a computer and a wireless electronic device as claimed in claim 2, when the computer receiving the re-pairing request message, the computer excluding the MAC address record of the wireless electronic device.

4. The method of pairing a computer and a wireless electronic device as claimed in claim 1, wherein the step of pairing the computer and the wireless electronic device comprises:

the wireless electronic device generating an initialization code;

the computer generating a first pairing data;

the wireless electronic device generating a second pairing data; and the computer transmitting the first pairing data to the wireless electronic device and receiving the second pairing data.

5. The method of pairing a computer and a wireless electronic device as claimed in claim 1, wherein the wireless electronic device is a wireless input device, a wireless audio output device or a wireless communication device.

* * * * *